Nov. 20, 1962
J. W. BLANTON
3,064,627
DERIVATIVE LOAD PRESSURE FEEDBACK
Filed March 23, 1959
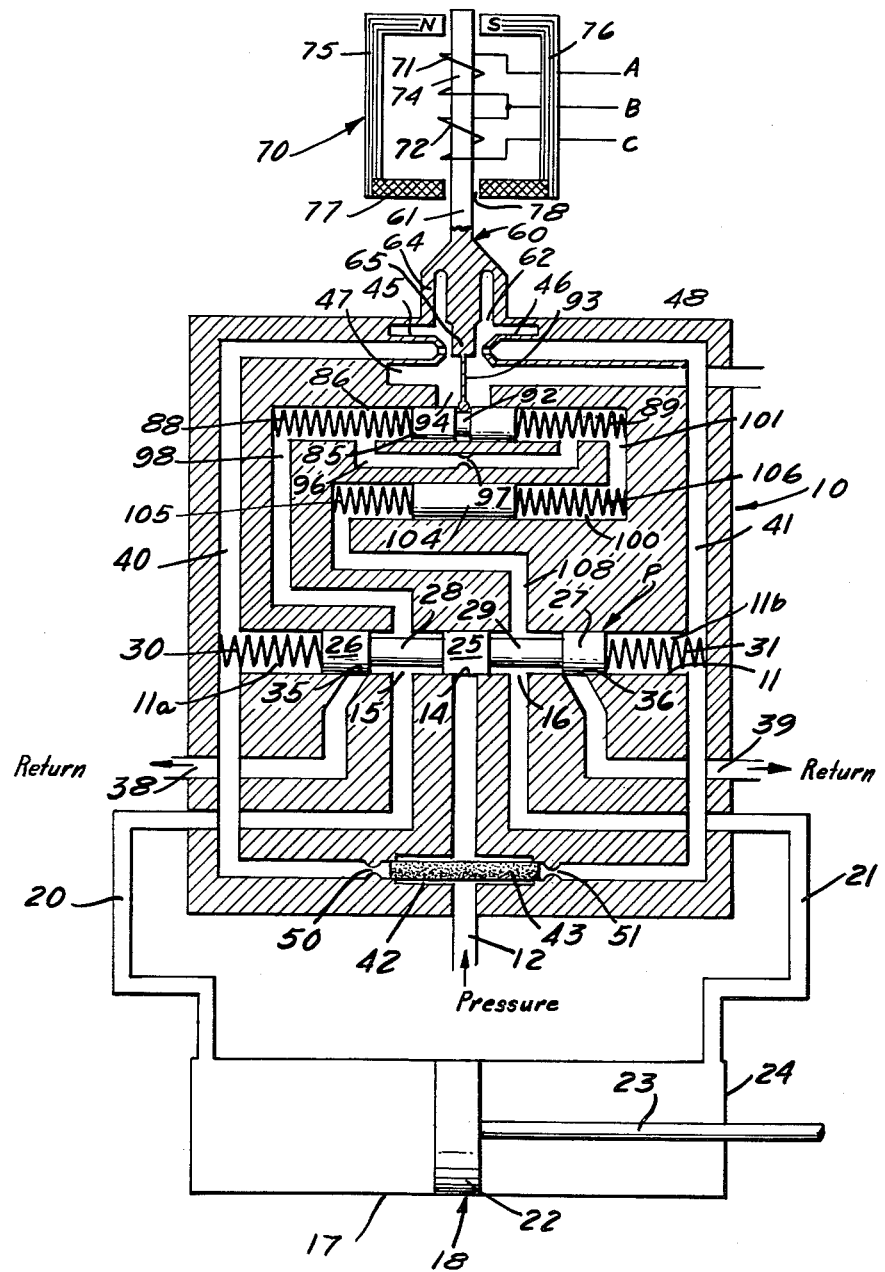
JOHN W. BLANTON,
INVENTOR.
WHANN & McMANIGAL
Attorneys for Applicant
by Robert Xh. Mc Manigal

3,064,627
DERIVATIVE LOAD PRESSURE FEEDBACK

John W. Blanton, Sunland, Calif., assignor to Bell Aerospace Corporation, Buffalo, N.Y., a corporation of Delaware
Filed Mar. 23, 1959, Ser. No. 801,301
11 Claims. (Cl. 121—41)

This invention relates generally to servomechanisms and relates more particularly to servomechanisms for hydraulic control systems and the like.

It is an object of the present invention to provide a mechanism of this character having an integrated feedback with an electrohydraulic servo valve mechanism, the invention being particularly useful in the actuation and control of systems with large load inertias.

A basic characteristic of certain conventional servo valve mechanisms is to apply full hydraulic system pressure to the actuator (piston) almost instantaneously with the application of a minimum unbalancing signal to the servo valve. This rapid application of full system pressure results in maximum actuator force being applied to the actuator load. If the load consists of a large inertia the overall result is that excessive acceleration forces are imposed upon the load structure due to the fact that an inertia resists instant force applications in proportion to its mass. It is, therefore, desirable that the application of actuator force or servo valve pressure be time integrated or applied more gradually so that the resistance of the load mass or inertia to acceleration does not impose destructive stresses upon the structure and linkages coupling the load inertia to the actuator.

A typical example of such a load system is the rocket engine on a ballistic missile which is positioned by a hydraulic control system to provide directional control of the missile.

It is another object of the present invention to provide a derivative load force feedback servo valve mechanism that will measure the actuator differential pressures which are proportional to load forces, compute hydromechanically the time derivative of these load forces and to feed this time derivative function back to the flapper or the servo valve in phase opposition to the initial signal into the servo valve.

Also, inherent in the operation of the computing network is a predetermined time lag which serves to match the overall dynamic characteristics of the servo valve to the requirements of the load system so that the desired degree of load force damping will be obtained. This time lag is inherent in the principle of operation of feedback networks in which there is a spring centered piston and a fixed bypass orifice hydraulically connecting the opposite ends of said piston so that upon the application of a differential pressure across the piston the motion of the piston will lag behind the applied pressure in time. This time lag is related to the size of the orifice, the area of the piston and the rate of the centering springs.

It is, therefore, another object of the present invention to provide, in a system of this character, means to insure the proper system stiffness. This is accomplished by the use of a second spring centered piston, without a bypass orifice, arranged in series with the other piston to isolate, hydraulically, the cylinder port circuits of the actuator.

It is still another object of the invention to provide mechanism of this character wherein the threshold and sensitivity thereof is greatly enhanced.

It is still another object of the invention to provide mechanism of this character wherein the overall valve reliability is greatly improved.

The characteristics and advantages of the invention are further sufficiently referred to in connection with the following detailed description of the accompanying drawing which represents one embodiment. After considering this example, skilled persons will understand that variations may be made without departing from the principles disclosed and I contemplate the employment of any structures, arrangements or modes of operation that are properly within the scope of the appended claims.

Referring to the drawing there is shown a schematic sectional view of a servo actuator mechanism embodying the present invention.

Referring more particularly to the drawing, there is shown a housing 10 having a bore 11 therein for a power valve, indicated generally at P.

There is a fluid pressure supply passage 12 extending into the body, said passage 12 being connected to any suitable source of pressure fluid, not shown. Passage 12 has a connection with the bore 11 through a port 14 intermediate the ends of the bore 11 and substantially at the longitudinal center thereof. At each side of the port 14 and spaced longitudinally therefrom a substantially equal distance are ports 15 and 16 which are connected to a cylinder 17 of an actuator, indicated generally at 18, the port 15 being connected to one end of the cylinder 17 by means of a conduit 20 while the port 16 is connected to said cylinder 17 adjacent the opposite end thereof by means of a conduit 21. Within the cylinder 17 is operably disposed a piston 22 having one end of a piston rod 23 connected thereto. Piston rod 23 extends through a wall 24 at one end of the cylinder 17 in the usual well-known manner.

Valve P comprises a central spool 25 which, when said valve P is centered as shown in the drawing, closes the port 14. There are end spools 26 and 27 in axial alignment with the spool 25 and said end spools are connected to the central spool by oppositely extending axially arranged reduced diameter parts 28 and 29 respectively. When the spool 25 is centered in the bore 11, the spools 28 and 29 are spaced somewhat outwardly of the ports 15 and 16. Normal centering of the valve P is effected by springs 30 and 31 in the end portions of the bore 11 which is substantially longer than the valve P so as to provide outer end portions or spaces 11a and 11b which permit operative movement of the valve longitudinally in the bore 11, provide room for the springs 30 and 31, and also serve as pressure chambers at the opposite ends of the power valve P.

The fluid pressure system for the actuator has a fluid return arrangement which includes return ports 35 and 36 respectively of the bore 11, said ports being connected to a return line, not shown, by respective conduits 38 and 39. Port 35 is spaced longitudinally outwardly of the port 15 and when the valve P is in its normal centered position, the port 35 is closed by the spool 26. Port 36 is spaced outwardly of the port 16 and is covered by the spool 27 when the valve P is centered. Ports 35 and 36 are so related to the spools 26 and 27 that movement of the valve P in the bore 11 in either direction will immediately uncover one or the other of the ports 35 or 36, depending on the direction of movement of said valve.

The hydraulic control system includes a pair of passages which may be termed branch passages 40 and 41, said branch passages being operably connected with the supply passage 12. At the point of connection of said branch passages with the passage 12, there is an enlarged passage portion 42 in which a filter 43 is disposed, said enlarged portion 42 being larger than the filter and providing space for the flow of pressure fluid from the passage 12 into the branch passages 40 and 41. Branch passages 40 and 41 are connected to the respective chambers 11a and 11b and are also connected with respective, oppositely arranged nozzles 45 and 46 which extend into a chamber 47 and discharge fluid thereinto which is carried back to any suitable reservoir or the like by means of a conduit or passage 48. Upstream of the chambers 11a and 11b, the conduits 40 and 41 are each provided with a calibrated restricted orifice, said orifices being indicated at 50 and 51 respectively.

Nozzles 45 and 46 are axially arranged relative to each other and the open discharge ends thereof are spaced apart.

Means is provided for controlling the discharge of fluid from said nozzles and said means comprises a flapper valve indicated generally at 60. Valve 60 includes a stem 61 which has its lower or inner end extending into the chamber 47 through an opening 62 in said body 10. The opening 62 is of substantially greater diameter than that of the stem portion therein to permit operative movements of said stem. The lower end portion of stem 61 is sealed to prevent leakage therepast by means of a tubular, isolation diaphragm 64 which provides a flexible pivotal support for the stem as well as a seal therefor. An example of such a diaphragm is disclosed in the Baltus et al. application, Serial No. 647,255, filed March 25, 1957, now Patent No. 2,947,285. The inner or lower end of the stem 61 has a portion 65 which is adapted to move toward and away from the adjacent ends of the nozzles 45 and 46 to thereby vary the openings in said ends.

Various means may be used to actuate the valve 60 by actuation of the upper or outer portion of the stem 61 which pivots at the isolation diaphragm, the stem 61 being movable clockwise and counterclockwise, as viewed in the drawing to move the end portion 65 toward and away from the open ends of the nozzles 45 and 46.

One means for actuating the valve 60 comprises a torque motor, indicated generally at 70, which comprises coils 71 and 72. Coil 71 is connected to suitable electrical equipment, not shown, by wires B, A while coil 72 is likewise connected to such electrical equipment by wires B, C. The upper portion 74 of the stem 61, exterior of the diaphragm 64, comprises an armature which is operably disposed relative to the coils 71 and 72 so that energization of either of said coils will effect operative movements of the armature 74 and stem 61 clockwise or counterclockwise according to which of the coils is energized. It is to be understood that the armature is of suitable material to be magnetically actuated, such material being a soft steel or the like for example. The torque motor 70 also includes a pair of oppositely arranged frames 75 and 76 which are in the general shape of inverted L's. The lower ends of the frames 75 and 76 are operably attached in the well-known manner to a magnet 77 having an opening 78 therein through which the stem operably extends. The adjacent free ends of the horizontal portions of the frames 75 and 76 are spaced apart with the upper end of the armature 74 operably disposed therebetween. The space between said free ends of the frames 75 and 76 is sufficiently great to permit proper operative movements of said armature and said adjacent ends of the frames are of opposite polarity, one being a south pole and the other being a north pole.

A hydraulic feedback system is also provided in the present mechanism and includes a derivative load pressure sensing piston 85 slidably disposed in a cylindrical bore 86 in the body 10. Piston 85 is normally centered in the bore 86 by means of oppositely acting springs 88 and 89 in the portions of the bore at the ends of the piston 85. Intermediate its ends the piston 85 is provided with an external annular groove 92 for reception of the free end of a feedback spring 93 extending from the inner end of the portion 65 of stem 61 and through an opening 94 provided therefor between the chamber 47 and bore 86. A bypass passage 96 interconnects the outer end portions of the bore 86 and said bypass passage is provided with a fixed calibrated restricted orifice 97. One end of the bore or cylinder 86, as for example the left-hand end is connected by means of a passage 98 with the bore 11 at a point adjacent the port 15 so that said passage 98 is at all times in communication with that portion of the bore 11 between the spools 25 and 26.

The other end of the cylinder 86 is connected with one end of a bore or cylinder 100 by means of a passage 101. Slidably disposed in the bore 100 is an isolation piston 104 which is normally centered in said cylinder 100 by means of oppositely acting springs 105 and 106 in the opposite end portions of the cylinder 100. The other end of the cylinder 100 is connected, by means of a passage 108, with that portion of the bore 11 adjacent the port 16 so that said passage 108 is at all times in open communication with said bore portion which is disposed between the spools 25 and 27.

As above pointed out, the valve 60 is actuated when an electrical input signal is transmitted from a suitable sensing device to one or the other of the coils 71, 72. Should the coil 71 be provided with such input signal, the armature 74 is attracted by the coil 71 in accordance with the value of said signal and said stem 61 will be moved counterclockwise, pivoting at the isolation diaphragm 64 so that the flapper end 65 will move toward the open end of the nozzle 46 and restrict flow of fluid therefrom to effect a build-up of fluid pressure downstream of the nozzle and in the chamber 11b. This causes the pressure in the passage 41 downstream of the restricted orifice 51 to increase relative to the pressure in the passage 40 downstream of the orifice 50 and in the chamber 11a so that there is an unbalancing of the pressures acting at opposite ends of the valve P with the higher pressure acting on the outer face of the spool 29 so that the valve P will move to the left, as viewed in the drawing. This movement of the valve P will cause uncovering of the port 14 so that pressure fluid will flow into the annular space between the part 29 of the valve P and the adjacent wall portion of the bore 11. This pressure fluid will pass through the port 16, into the conduit 21 and into that portion of the cylinder 17 which is at the right of the piston 22 as viewed in the drawing. Simultaneously with the opening of the port 14 the spool 26 will move sufficiently to uncover port 35 so that pressure fluid at the opposite end of the cylinder 17 will flow through the conduit 20, the annular space between the part 28 of the valve P and the adjacent wall portion of the bore 11, through the port 35 and return conduit 38 as the piston moves toward the left due to the higher pressure at the right-hand side thereof. Should a reverse action of the piston be required the electrical signal from the sensing means, above referred to, will energize the coil 72 to cause the stem 61 to be moved clockwise and effect restriction of the outlet of the nozzle 45 according to the strength of the signal. This will cause a pressure build-up in the conduit 40 downstream of the orifice 50 which will cause the valve P to move toward the right and effect delivery of pressure fluid to the left-hand side of piston 22. The return port 36 will be opened at this time to permit exhaust of pressure fluid from that portion of the cylinder at the right of said piston.

The hydraulic system or circuit which includes the pistons 85 and 104 and the bypass 96 with its restricted orifice 97 is part of the actuator pressure system.

When the flapper valve stem 61 is actuated by the torque motor, for example in the counterclockwise direction, and when the power valve has moved to the left, as described above, pressure will be applied to the left-hand end of the piston 104 by pressure fluid from the bore 11 transmitted through the passage 108. This pressure will also be transmitted to the right-hand end of the derivative load pressure sensing piston 85 through the fluid in the passage 101 so that the piston 85 is urged toward the left. There will be a flow of fluid through the orifice 97 of the bypass 96 with the pressure in the passage 98 substantially the same as the pressure in the passage 20 just as the pressure in the passage 108 is substantially the same as that in the passage or conduit 21. With the above action of the mechanism the parts thereof will return to their normal positions.

Thus, the derivative load pressure sensing piston 85 measures the actuator differential pressures which are proportional to load forces, to compute hydromechanically the time derivative of these load forces and to feed this time derivative function back to the flapper valve in phase opposition to the initial signal to the torque motor. That is the basic time derivative computation is performed with the spring centered piston 85 and the parallel orifice 97. The load differential pressure is measured across this piston using a technique which prevents the orifice from bypassing the actuator cylinder ports. Since the orifice bypassed piston position is proportional to the time derivative of load force or actuator cylinder differential pressure this piston position is mechanically fed back to the flapper valve.

As pointed out above, inherent in the operation of the computing network is a predetermined time lag which serves to match the overall dynamic characteristics of the servo valve to the requirements of the load system so that the desired degree of load force stamping will be obtained. In this circuit which has the spring centered piston 85 and the parallel fixed bypass orifice 97, externally or internally of the piston 85, upon the application of a differential pressure across the piston the motion of the piston will lag behind the applied pressure in time. This time lag is related to the size of the orifice, the area of the piston and the rate of the centering springs.

In order to provide the proper system stiffness the second spring centered piston, 104, is provided and there is no bypass orifice for this piston so that it will isolate, hydraulically, the cylinder port circuits of the actuator. This hydraulic isolation prevents hydraulic leakage across the cylinder ports and thus prevents loss of system stiffness and also prevents positional errors.

In this arrangement the forces required to produce feedback on the servo valve flapper are in order of magnitude less than those forces required to produce feedback of the power spool so that the threshold and sensitivity of the device is greatly enhanced and the overall valve reliability is improved.

It is thought that the invention and many of its attendant advantages will be understood from the foregoing description and it is believed that it will be apparent that various changes may be made in the form, construction and arrangement of the parts of the invention without departing from the spirit and scope thereof or sacrificing all of its material advantages, the embodiment hereinbefore described being merely for purposes of illustration.

I claim:

1. In a hydraulic control mechanism: power valve means including a power valve cylinder having an inlet port, actuator fluid ports and return ports; a power valve slidably mounted in said cylinder; yielding means normally balancing said valve member at a neutral position whereat the inlet port and return ports are closed; an actuator having a part adapted to be connected to a device to be actuated, said actuator part being movable in opposite directions by fluid pressure applied respectively to opposite sides thereof, said opposite sides being connected to the actuator fluid pressure ports of the power valve cylinder; a pair of opposed nozzles spaced apart; conduits connecting each of said nozzles with said supply conduit and each of said conduits having a connection with one end of the power valve cylinder and also having respective orifices upstream of such connections; a flapper valve having a part movable between the open opposing ends of said nozzles; means for actuating said flapper valve; and feedback means including a feedback cylinder having a connection with the power valve cylinder to receive fluid pressure substantially equal to that of one side of the actuator; a feedback piston slidable in the feedback cylinder; bypass passageway means hydraulically connecting the opposite ends of the feedback cylinder for bypassing said feedback piston, said bypass passageway having a restricted orifice therein; yielding means normally positioning said feedback piston in a neutral position; an isolation cylinder having one end connected to the opposite end of the feedback cylinder and having its other end connected with the power valve cylinder so as to have fluid pressure at said end substantially the same as the pressure of the other side of the actuator; an isolation piston in said isolation cylinder; yielding means normally positioning said isolation piston in a neutral position; a yielding means carried by the flapper valve yieldingly connecting said flapper valve with the feedback piston.

2. In a hydraulic control mechanism: power valve means including a power valve cylinder having a pressure fluid inlet port, and a pair of actuator circuits including actuator fluid ports and fluid return ports; a power valve slidably mounted in said cylinder; yielding means normally balancing said valve member at a neutral position whereat the inlet port and return port are closed; an actuator having a part adapted to be connected to a device to be actuated, said actuator part being movable in opposite directions by fluid pressure applied respectively to opposite sides thereof, said opposite sides being connected to the actuator fluid pressure ports of the power valve cylinder; conduits connecting said supply conduit and respective ends of the power valve cylinder so that said power valve is normally urged in opposite directions by balanced fluid pressures; means for unbalancing said fluid pressures; and feedback means including a feedback cylinder having a connection with the power valve cylinder to receive fluid pressure substantially equal to that of one of the actuator circuits; a feedback piston slidable in the feedback cylinder; bypass passageway means hydraulically connected to the feedback cylinder and bypassing said feedback piston, said bypass passageway having a restricted orifice therein; yielding means normally positioning said feedback piston in a neutral position; an isolation cylinder having one end connected to the opposite end of the feedback cylinder and having its other end connected with the power valve cylinder so as to have fluid pressure at said end substantially the same as the pressure of the other actuator circuit; an isolation piston in said isolation cylinder; yielding means normally positioning said isolation piston in a neutral position; and yielding means carried by the flapper valve yieldingly connecting said flapper valve with the feedback piston.

3. In a hydraulic control mechanism: power valve means including a power valve cylinder having a centrally located inlet port, an actuator fluid port longitudinally spaced from and at each side of said inlet port, and a return port longitudinally spaced outwardly of each actuator port; a power valve slidably mounted in said cylinder; yielding means normally balancing said valve member at a neutral position whereat the inlet port and return ports are closed; an actuator having a part adapted to be connected to a device to be actuated, said actuator part being movable in opposite directions by fluid pressure applied respectively to opposite sides thereof; said opposite sides being connected to the actuator fluid pressure ports of the power valve cylinder; conduit means connecting said supply conduit with the ends of the pressure valve cylinder so that the power valve is subjected to opposed but normally balanced fluid pressures; means for unbalancing said pressures; and feedback means including a feedback cylinder having a connection with the power valve cylinder to receive fluid pressure substantially equal to that of one side of the actuator; a feedback piston slidable in the feedback cylinder; bypass passageway means hydraulically connecting the opposite ends of the feedback cylinder for bypassing said feedback piston, said bypass passageway having a restricted orifice therein; yielding means normally positioning said feedback piston in a neutral position; an isolation cylinder having one end connected to the opposite end of the feedback cylinder and having its other end connected with the power valve cylinder so as to have fluid pressure at said end substantially the same as the pressure of the other side of the actuator; an isolation piston in said isolation cylinder; yielding means normally positioning said isolation piston in a neutral position; and means operably connecting said feedback piston and the means for unbalancing said pressures on the power valve.

4. Control means for controlling fluid pressure in a fluid pressure actuator system having a pair of pressure fluid port circuits comprising: control means for selectively supplying pressure fluid to respective circuits, said means including a cylinder connected with said circuits; a fluid flow control valve slidable longitudinally in said cylinder and normally balanced at a neutral closed position; pressure fluid passageways connected to respective ends of said cylinder to normally apply fluid pressure of equal value to the opposite ends of said valve; a restricted orifice in each passageway upstream of their connections with said cylinder; signal pressure responsive means for controlling the relative pressures in said passageways to effect actuation of said control valve for selectively supplying actuating pressure to the port circuits of the actuator pressure system; feedback means including derivative load pressure sensing means and respective fluid pressure conducting means connected respectively to said circuits; means hydraulically bypassing said derivative load sensing means, said bypass means having a restricted, calibrated orifice therein; yielding means for normally positioning said derivative load sensing means in a neutral position; and means in one of said fluid pressure conducting means hydraulically isolating the port circuits of the actuator.

5. Control means for controlling fluid pressure in a fluid pressure actuator system having a pair of fluid circuits, comprising: control means for selectively supplying pressure fluid to respective circuits, said means including a cylinder connected with said circuits; a fluid flow control valve slidable longitudinally in said cylinder and normally balanced at a neutral closed position; pressure fluid passageways connected to respective ends of said cylinder to normally apply balanced fluid pressures to the opposite ends of said valve; means responsive to a signal for unbalancing said balanced fluid pressures to effect actuation of said control valve for selectively supplying actuating pressure to the circuits of the fluid pressure actuator system; feedback means including pressure responsive means operably connected across said circuits and responsive to the differential of pressure on opposite sides thereof, said pressure responsive means having a restricted bypass connection between said opposite sides; means operably connecting said pressure unbalancing means and feedback pressure responsive means, said feedback means measuring the differential pressure of said actuator circuits to compute the time derivative of the actuator load forces and feed same back to the means for unbalancing said blanced pressures in phase opposition to the initial signal to said pressure unbalancing means; yielding means for normally positioning said pressure responsive means in a neutral position; and means hydraulically isolating the connection across said circuits.

6. In control means for controlling fluid pressure for operating a hydraulically operated actuator: valve means for selectively controlling the flow of fluid to and from said actuator; signal responsive means for controlling said valve means; hydraulic feedback means hydraulically connected to said actuator, said hydraulic feedback means measuring the differential of pressures to and from said actuator to compute the time derivative of the load forces of the actuator; means for feeding same back to the signal responsive means in phase opposition to the initial signal to said valve control means; and fluid pressure responsive means hydraulically isolating the connections of the feedback means with the hydraulic system of the actuator.

7. Control means for controlling fluid pressure in a fluid pressure actuator system having a pair of hydraulic actuator circuits, comprising: control means for selectively applying pressure fluid to respective circuits; a fluid flow control valve slidable longitudinally in said cylinder and normally balanced at a neutral closed position; pressure fluid passageways connected to respective ends of said cylinder to normally supply balance fluid pressures to the opposite ends of said valve; means responsive to a signal for unbalancing said balanced fluid pressures to effect actuation of the control valve for selectively supplying actuating pressure to the circuits of the fluid actuator system; feedback means including a hydraulic feedback circuit operably connected to said actuator circuits, said feedback means also including a pressure responsive means in the feedback circuit, said pressure responsive means being responsive to variations in the differential of pressures in the actuator circuits, there being restricted fluid pressure conducting means connecting said actuator circuits and bypassing said pressure responsive feedback means; means operably connecting said pressure unbalancing means and feedback pressure responsive means; yielding means for normally positioning said pressure responsive means in a neutral position; and means in the feedback circuit hydraulically isolating the actuator circuits.

8. In control means for controlling fluid pressure for operating a hydraulically operated actuator: valve means for selectively controlling the flow of fluid to and from said actuator; signal responsive means for controlling said valve means; hydraulic feedback means hydraulically connected to said actuator, said hydraulic feedback means measuring the differential of pressures to and from said actuator to compute the time derivative of the load forces of the actuator; means for feeding same back to the signal responsive means in phase opposition to the initial signal to said valve control means; and fluid pressure responsive means hydraulically isolating at least one of the connections of the feedback means with the hydraulic system of the actuator.

9. In control means for hydraulic fluid pressure systems: valve means having a fluid pressure port and work ports for fluid, said valve means having a movable valve member for selectively controlling the flow of fluid from said pressure port to respective work ports; signal responsive means for controlling said valve means; derivative load fluid pressure sensing means hydraulically connected to said work ports; feedback means interconnecting said derivative load fluid pressure sensing means and the signal responsive means in phase opposition to the initial signal to said valve control means; and fluid pressure responsive isolation means hydraulically isolating the connections of the sensing means with said work ports.

10. In control means for a hydraulic fluid pressure system: valve means having a fluid pressure port and work ports for fluid, said valve means having a movable valve member for selectively controlling the flow of fluid from said pressure port and to respective work ports; signal responsive means for controlling said valve means; derivative load fluid pressure sensing means hydraulically connected to said work ports; feedback means interconnecting said derivative load fluid pressure sensing means and the signal responsive means in phase opposition to the initial signal to said valve control means; fluid pressure responsive isolation means hydraulically isolating the connections of the sensing means with said work ports; and yielding means normally positioning the isolation means in a neutral position.

11. In control means for a hydraulic fluid pressure system: valve means having a pressure port and work ports, said valve means having a movable valve member controlling the flow of fluid through said valve means; derivative load pressure sensing means hydraulically connected to said work ports; and fluid pressure responsive isolation means hydraulically isolating at least one of the connections of the sensing means with said work ports.

References Cited in the file of this patent

UNITED STATES PATENTS

| | | |
|---|---|---|
| 2,582,088 | Walthers | Jan. 8, 1952 |
| 2,767,689 | Moog | Oct. 23, 1956 |
| 2,790,427 | Carson | Apr. 30, 1957 |
| 2,823,689 | Healy | Feb. 18, 1958 |
| 2,860,606 | Ainsworth | Nov. 18, 1958 |
| 2,909,195 | Keyt | Oct. 20, 1959 |
| 2,945,478 | Hanna | July 19, 1960 |
| 2,947,286 | Baltus et al. | Aug. 2, 1960 |
| 2,953,149 | Lynn | Sept. 20, 1960 |
| 2,954,794 | Paine | Oct. 4, 1960 |